United States Patent [19]
Griest, Jr.
[11] 3,755,796
[45] Aug. 28, 1973

[54] COBALT-PLATINUM GROUP ALLOYS WHOSE ANISOTROPHY IS GREATER THAN THEIR DEMAGNETIZABLE FIELD FOR USE AS CYLINDRICAL MEMORY ELEMENTS

[75] Inventor: Andrew J. Griest, Jr., Shelburne, Vt.

[73] Assignee: International Business Machines Corporation, Armonk, N.Y.

[22] Filed: June 30, 1971

[21] Appl. No.: 158,302

[52] U.S. Cl. ......... 340/174 NA, 75/170, 148/31.55, 148/31.57, 340/174 PM, 340/174 TF

[51] Int. Cl. ............................................ G11c 11/02

[58] Field of Search ...................... 148/31.55, 31.57, 148/100, 101, 105; 75/170; 340/170 PM, 174 NA, 174 PM, 174 TF

[56] References Cited

UNITED STATES PATENTS

| | | | |
|---|---|---|---|
| 3,470,547 | 9/1969 | Bobeck | 340/174 PM |
| 3,374,113 | 3/1968 | Chang et al. | 148/101 |
| 3,206,337 | 9/1965 | Walmer | 148/31.57 |
| 3,085,036 | 4/1963 | Steinort | 148/31.57 |
| 3,434,892 | 3/1969 | Heimke | 148/101 |
| 3,669,643 | 6/1972 | Bagley et al. | 148/105 |

OTHER PUBLICATIONS

Bozorth, R. M.; Ferromagnetism; New York 1951 pp. 285, 289, 294, and 412–414. (QC753B69)

*Primary Examiner*—Dewayne Rutledge
*Assistant Examiner*—W. R. Satterfield
*Attorney*—Francs J. Thornton

[57] ABSTRACT

A magnetic cylindrical domain memory element and array comprising a ferro-magnetic, metallic, cobalt base, hexagonal, single crystal alloy having anisotropic characteristics, means for creating magnetic domains in the alloy and means for maintaining and manipulating the domains in the alloy. The alloy is composed of more then 50 percent cobalt and contains an addition element depressing the saturation magnetization field of the cobalt, but stabilizing the hexagonal phase of the cobalt to a higher temperature. This improvement is achieved without materially changing the magneto-crystalline anisotropy inherent in the hexagonal cobalt structure. The addition elements include ruthenium, rhenium, osmium, rhodium, iridium, silicon, germanium, arsenic, and platinum.

10 Claims, 2 Drawing Figures

INVENTOR
ANDREW J. GRIEST JR.
BY Francis J. Thornton
ATTORNEY

COBALT-PLATINUM GROUP ALLOYS WHOSE ANISOTROPHY IS GREATER THAN THEIR DEMAGNETIZABLE FIELD FOR USE AS CYLINDRICAL MEMORY ELEMENTS

BACKGROUND OF THE INVENTION

1. Field of the Invention

This invention relates generally to materials for magnetic cylindrical domain memories which are also known as domain wall device memories.

2. Description of the Prior Art

Domain wall devices and the magnetic domain behavior in single-crystal magnetic oxides has been extensively studied and discussed in the literature. More recently, single-crystal oxides and ortho-ferrites have also been studied and considered for use in memory and logic devices. Broadly, rare-earth ortho-ferrites have a general formula of the form $RFeO_3$, where R is one of the rare earth elements, or yttrium. Such ortho-ferrites and hexagonal ferrites have been considered for cylindrical domain memory devices.

However, such ortho-ferrite single crystals are usually grown by the so-called melt-flux technique and the usable, homogeneous, defect free bodies of material so grown rarely exceed 0.25 × 0.25 inches in planar dimension. Thus, although bit densities of $10^6$ per square inch have been theorized and, indeed, appear possible for such ortho-ferrite domain wall materials, the practical limitation of producing large arrays by presently known techniques is severely limited. Such ortho-ferrites and their applications to domain wall devices have been discussed in the literature; see, for example: "IEEE" Transaction on Magnetics, Vol. Mag-5, Sept., 1969.

U.S. Pat. No. 3,460,116 discloses the use of such yttrium ortho-ferrite materials in a two-dimensional shift register array. This patent is one of the earlier patents describing such magnetic memory arrangements. Otheer Other typically are uU.S. Pat. Nos. 3,470,546; 3,470,547, 3,471,840; 3,534,341; 3,534,346 and 3,534,347.

Additionally, in a paper entitled, "Material Requirements for Circular Magnetic Domain Devices" which appeared in the "IEEE" Transactions of Magnetics, Sept., 1969, Mag-5, page 558, U.F. Gianola and his co-authors discussed the material requirements for cylindrical domain stability. According to their analysis, metallic cobalt should not be able to sustain stable cylindrical domains, (sometime colloquially referred to as "magnetic bubbles") because the de-magnetizing field is greater than the anisotropy field of the material. However, a paper appearing in "Acta Physica Polonica," Vol. XXXV, 1969, pages 179 to 185, by B. Wyslocki, alleges that magnetic bubbles have been seen in metallic cobalt. The stable bubble diameter of such cobalt bubbles, is quite small and can only exist normally in very thin specimens or films.

SUMMARY OF THE INVENTION

The present invention is particularly directed towards an improved magnetic cylindrical domain memory that uses a cobalt based, hexagonal, single-crystal alloy having anisotropic characteristics that can be grown in large crystal form. The alloy must contain an addition element capable of depressing the magnetization of the cobalt while stabilizing the hexagonal phase structure of the cobalt to higher temperatures.

The preferred addition elements include ruthenium, rhenium, osmium, rhodium, iridium, silicon, germanium, arsenic, and platinum.

Accordingly, it is an object of the invention to prepare magnetic cylindrical domain memory alloys.

It is another object of the invention to prepare new cobalt based alloys which have anisotropic characteristics.

It is a further object of the invention to prepare ferromagnetic, metallic, cobalt based, hexagonal, single-crystal alloys containing selected addition elements for depressing the de-magnetizing field of the cobalt below its anisotropy field and simultaneously stabilizing the hexagonal phase of the cobalt to a higher temperature.

Still another object of the invention is to prepare a cobalt alloy, having one or more of the following addition elements which include, include: rhenium, osmium, rhodium, iridium, silicon, germanium, arsenic, and platinum.

It is another object of the invention that the addition elements should depress the saturation magnetization of cobalt, thus reducing the de-magnetizing field which is directly related thereto, while stabilizing the hexagonal phase of the cobalt to higher temperatures; preferably, up to the solidus temperature so that large single crystals can be grown from the melt without passing through a phase change that introduces grain boundaries, stacking faults, and other such defects, and without weakening the magneto-crystalline anisotropy inherent in the hexagonal cobalt structure to such an extent that the anisotropy field becomes less than the demagnetizing field.

Still further, it is an object of the invention to produce such materials as single-crystals in large area, thin film form, which is not presently possible in the art with the complex stoichiometric oxides (ortho-ferrite, etc.) which are now used for cylindrical domain elements.

The foregoing, and other objects, features and advantages of the invention will become apparent from the following more particular description of preferred embodiments of the invention.

DESCRIPTION OF THE PREFERRED EMBODIMENTS

Figure 1:
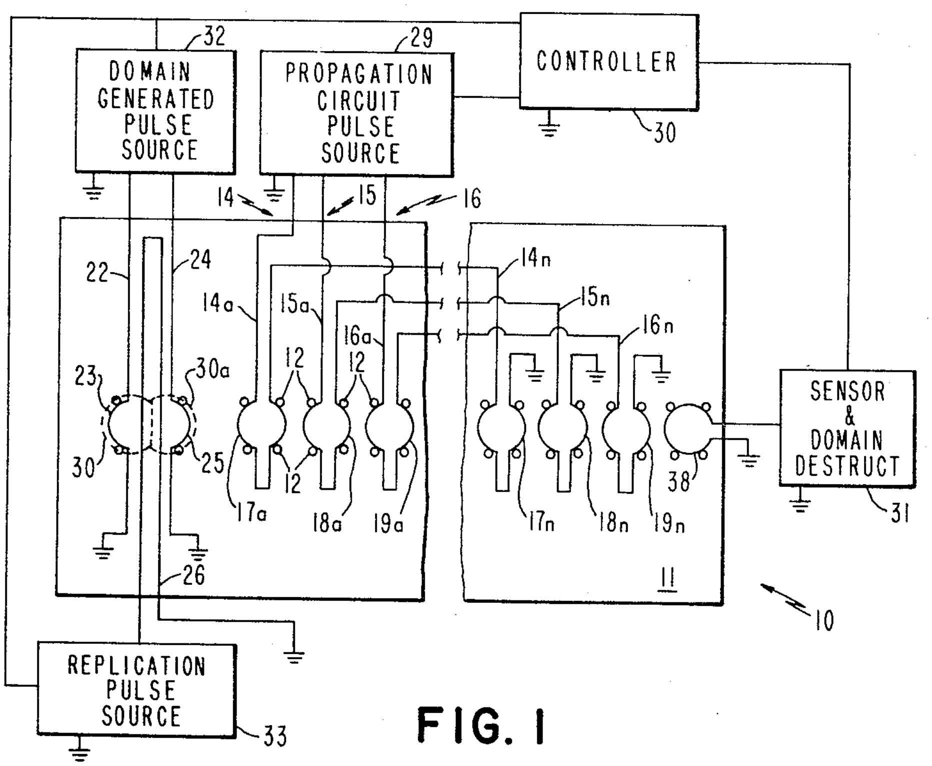
FIG. 1 illustrates a simple memory element in shift register form capable of utilizing hexagonal-cobalt alloys as the cylindrical domain material.

Referring in particular to FIG. 1 there is shown a top view of a magnetic domain shift register 10 formed on a sheet 11. The sheet 11 includes a hexagonal-cobalt alloy, of the invention having an easy axis of magnetization normal to the planar surface and an anistropy field Hk greater than its demagnetizing field $4\pi Ms$ (Ms being equal to the saturation magnetization of the materials).

It is well known that magnetic domains can exist in a plate of suitable magnetic material of uniform thickness whose magnetization lies normal to its surface due to uniaxial anisotropy. Such domains usually have a domain-wall width which is small in relation to the domain diameter and shape and size independent of coercivity.

Preferably, the thickness of the material is controlled as a ratio of the diameter of the domains that can be sustained therein, so that domain diameter is minimized and the ability of the domains to recover from fluctuations, in size or shape, is maximized. Additionally, there are domain stability requirements relating to the anisotropy field Hk and the saturation magnetization Ms which influence the size, stability, nucleation and mobility of circular domains in a material.

In order for a material to be suitable for the sustaining and propagation of magnetic domains, it is necessary that its anisotropy field Hk is greater than its demagnetizing field $4\pi Ms$ (Ms = saturation magnetization).

Figure 2:
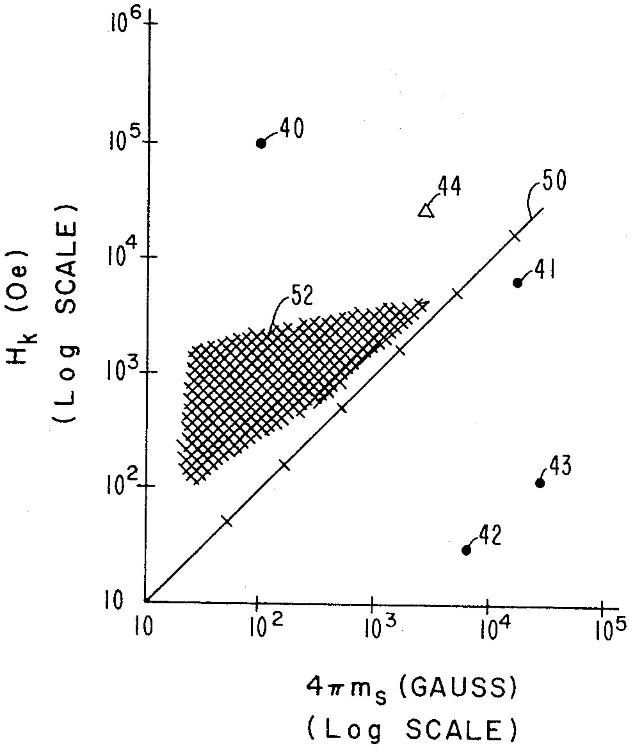
FIG. 2 is a graph showing the demagnetizing field vs. anisotropy field characteristics of various materials.

FIG. 2 is a chart of Hk vs. $4\pi Ms$ (logarithmic coordinates) showing the relative position of different magnetic materials known to the prior art and the relative positions of the materials described by the present invention.

Since in general, the anisotropy Hk of the domain sustaining material must be greater than the demagnetizing field $4\pi Ms$ of the material, only materials to left of line 50 which defines the boundary $Hk = 4\pi Ms$, such as the rare earth ortho-ferrites, e.g., $FeO_3$,- shown by point 40 can be capable of supporting circular domains. Whether or not they can so support such circular domains depends on whether or not they have a sufficiently large uniaxial component wall energy. Thus ortho-ferrites which have an orthorhombic structure, of which $YFeO_3$ is typical, generally have an anisotropy of $10^5$, and a bubble size of $10_2$ microns. These mateirals although capable of sustaining bubbles have, however, a Curie temperature near room temperature and have properties that are strongly temperature dependent, thus are not preferred for practical memory arrays.

Hexagonal ferro-magnetic materials, of which the magneto plumbite, $Ba\ Al_x\ Fe_{(12-x)}O_{19}$ is typical, generally have a net magnetization easy axis parallel to their hexagonal axis or the base plane, depending upon the sign of its uniaxial anisotropy term. These materials, indicated generally by point 44 in FIG. 2, have large room temperature values of $4\pi Ms$ and the circular domains are quite small being typically less than 0.3 microns.

Magnetic materials such as cobalt, nickel and iron shown by points 41, 42 and 43, respectively, that lie to the right of line 50 are normally not capable of supporting mobile, circular domains.

Of these magnetic materials, cobalt is normally not suitable since (1) its demagnetizating field is excessively high and (2) it is difficult to prepare in the pure state as a single crystal hexagonal phase, since some cubic phase material is usually present.

In hexagonal phase cobalt there is a preferred axis of magnetization, and bubbles, of approximately 5000 angstroms in diameter, in films 5000 A. thick or less have been reported. However, the reported bubbles have not been found to be stable in films thicker than 5000 A. and thus the material as such is entirely undesirable for use as magnetic domain material.

The materials of the present invention, however, have the advantage of being grown in large single crystal form from simple alloy solutions not requiring a precise stoichiometric ratio which is required by ortho-ferrites, garnets, etc.

Also, the materials of the present invention are easier to produce in thin film form than are the complex oxides of the hexagonal ferro-magnetic materials.

It is to be noted, as shown in FIG. 2 at 41, that pure cobalt almost meets the requirement that its anisotropy field exceed its de-magnetizing field. Thus to make cobalt useful as a cylindrical domain memory material, it is necessary that its de-magnetizing field be lowered while its anisotropy field either remain at substantially the same level, or at least exceed $4\pi Ms$. This is accomplished, in the present invention, by alloying with cobalt an addition element capable of depressing the demagnetizing field of the cobalt while retaining a high anisotropy field by stabilizing the hexagonal phase structure of cobalt to higher temperatures. The alloy thus created will fall in the cross-hatched area 52 shown in FIG. 2. Preferred addition elements are listed in Table 1 together with their preferred range.

TABLE 1

| Addition Element | Percentage Range Atomic Percent |
|---|---|
| Arsenic | up to 4 % |
| Germanium | up to 10 % |
| Iridium | 2.8–40 |
| Osmium | 2,8–40 |
| Platium 5.0–12 | |
| Rhodium | 5.0–20 |
| Rhenium | 5.0–25 |
| Ruthenium | 3.6–35 |
| Silicon 3.6–12 | |

The cobalt-based alloys of the present invention may be formed by several different techniques.

METHOD 1

Cobalt is melted, in any conventional manner, and one of the above listed addition elements is added within the listed preferred range. The concentration of the addition element is selected to raise the transformation temperature (e.g., the temperature at which the cobalt changes from the hexagonal phase to the face-centered-cubic phase), to as high a temperature as possible. Proper adjustment of the alloy content is necessary to insure that the Curie temperature remain considerably above room temperature and is well within the skill of a competent metallurgist.

Preferably, the addition element should raise the transformation temperature of the alloy up to the solidus temperature of the alloy. This increase in transformation temperature permits crystals to be grown from the melt without passing through a phase change that introduces grain boundaries, stacking faults and other defects.

The hexagonal, close packed, crystal phase of cobalt is particularly strongly stabilized by the addition of 25 atomic percent of rhenium, or 34 atomic percent of ruthenium or 33 atomic percent of osmium. Simultaneously, the addition of any of the above materials will reduce the de-magnetizing field $4\pi Ms$ by lowering the magnetic saturation of pure cobalt from 17,900 gauss to between 100 and 1000 gauss. Thus when these addition elements are added to cobalt, large single hexagonal crystals suitable for magnetic cylindrical domain materials can be grown from the melt. The rod or boule so formed must now be cut into wafers of desired thickness and prepared for use in the memory array of FIG. 1 by known polishing and etching steps.

METHOD 2

A fine grained, polycrystalline, hexagonal phase ingot of an alloy composed of cobalt and selected addition elements is grown from a melt composed of cobalt and the addition element by any convenient method. The ingot is mechanically worked by forging, rolling or other method to form a polycrystalline rod or bar suitable for the subsequent processing into a single crystal from which wafers of the material can be cut. The polycrystal rod thus formed is then plastically strained by elongating it between 1 percent and 3 percent and annealed at a temperature sufficient to cause re-crystallization and exaggerated grain growth but lower than the transformation temperature. Because the rate of re-crystallization and grain growth of alloys increases with higher annealing temperatures, it is desirable to have the transformation temperature as high as possible. As a general rule, the rates at which such thermally activated processes in such alloys proceed do not become significant enough to be of practical value until the transformation temperature exceeds half the melting temperature. Thus for use with this method, (commonly known as the strain-anneal method) the following system and ranges of alloy contents:

Co – Si: 3.6 – 12 atomic percent Si
Co – Re: 5.0 – 25 atomic percent Re
Co – Ru: 3.6 – 35 atomic percent Ru
Co – Ir: 2.8 – 20 atomic Ir
Co – Rh: 5.0 – 17.5 atomic percent are are preferred. Here again the alloy is obtained as a rod or boule, which must then be cut into wafers of desired thickness and further prepared by polishing and etching before it can be used as the memory element in FIG. 1.

METHOD 3

A previously alloyed sputtering target of cobalt containing a preferred addition element is placed in a conventional sputtering system containing an inert gas at a pressure of between 10 – 100 microns together with a suitable single crystal substrate upon which sputtered material can be deposited. The substrate and its orientation should be such that a good epitaxial match is possible with the sputtered material deposited thereon, so that the hexagonal cobalt alloy film will grow with the (0001) axis normal to the plane of the substrate. The (0001) face of Mica and (0001) face of sapphire have been shown to provide a good epitaxial base for such hexagonal cobalt films.

The sputtering apparatus is now operated in the conventional manner such that the alloy is sputtered from the target and deposited on the substrate. Sputtering may be done by either the RF or DC mode with or without substrate bias. Preferred growth of properly oriented crystals can be aided by the application of a sufficiently high magnetic field applied normal to the plane of the substrate during deposition.

By utilizing such a sputtering system to form the thin film of preferred material of a multi-component system, a number of advantages are derived. For one, the chemical composition of sputtered film is essentially the same as that of the cathode; and, two, because of the high efficiency of the sputtering process and the small amount of material required for a thin film, it is practical to use precious metals such as ruthenium, rhenium, etc., in these devices. The cost of bulk alloys from these materials would otherwise be prohibitive.

The three above described processes result in alloys of cobalt with various metallic addition elements included therein which are suitable for use as the memory element in FIG. 1. The addition elements include but are not limited to binary additions of arsenic, germanium, iridium, rhodium, silicon, ruthenium, rhenium and osmium which have a uniaxial anisotropy promoting hexagonal phase growth. Under one or more of the following conditions: (1) growth from the melt (2) growth in the solid state from a critical strain condition and (3) growth by vapor deposition process; i.e., sputtering.

Returning now to FIG. 1, it is been that there is deposited on the upper surface of the cobalt alloy sheet 11 an array of permalloy dots 12 to define the location of the storage elements for it has been found that cylindrical domains, in cylindrical domain material, prefer a position in contact with such permalloy dots. The diameter and separation of the dots is chosen to be consistent with the stable cylindrical domain size that is found in the material forming sheet 11. The dots further serve as localized flux closure paths for the domains thereby reducing the magneto-static energy and assist in achieving directionality is movement of domain through the sheet 11 by providing low energy sites for the domains and also by placing the domains in a consistent preferred position. Such permalloy dots when used with the cobalt alloys of the invention are preferably 4000 angstroms thick, 1 mil in diameter and spaced on 4 mil centers along the propagating track.

Overlying the permalloy dots 12 and the sheet 11 is a propagation circuit comprising a plurality of thin-film conductors 14, 15 and 16, each of which has a plurality of legs 14*a*, 15*a*, 16*a*, 14*n*, 15*n* and 16*n*. Each leg is fabricated with a conducting loop therein. Thus legs 14*a* and 14*n* contain loops 17*a* and 17*n*, respectively. Legs 15*a* and 15*n* contain loops 18*a* and 18*n*, respectively; and, legs 16*a* and 16*n* contain loops 19*a* and 19*n*, respectively.

Adjacent to the propagation circuit is a replication circuit comprising a line 22 having a half-loop 23 therein, and a second line 24 having a half-loop 25 therein, and a splitter loop 26 passing between the lines 22 and 24. The conductors 14, 15 and 16 are coupled to a pulse source 29, connected to a controller 30, which is coupled to a sensor and domain destruct circuit 31, a domain generator pulse source 32 and a replication pulse source 33. The domain generator pulse source 32 is coupled to the lines 22 and 24, while the replication pulse source 33 is connected to the bubble splitter loop 26. The sense and domain destruct circuit 31 is coupled to a sensing loop 38.

In order to utilize cylindrical domains in shift registers such as shown in FIG. 1, motion of the domains in the material in discrete steps is required at specific times and therefore, it is necessary to produce in the material highly localized fields. Such fields can be produced in the sheet 11 by applying a suitable voltage to the thin film conductive loops lying on the surface of the sheet 11.

The dimensions from the center of each loop to the center of the next adjacent loop of the propagation circuit are chosen to provide controlled motion of the domains in the material. For the cobalt alloys of this invention, the domain diameters, depending on the specific composition, can range from 0.5 to 5.0 mils.

The conductive loop patterns shown in FIG. 1, therefore, must, under conventional bias conditions for transferring bubbles through the sheet 11, have resultant field profiles which will contact some portion of the bubble contained within the next adjacent loop. It is therefore necessary that each conductor pattern be laid down on the surface of the sheet 11 such that the center line of each conductive pattern is separated from the center line of the next adjacent conductive pattern by an amount equal to the diameter of the stable domain created in the material. This, spacing requirement, because of the limitations of the present state of the art techniques of depositing such thin film conductors on surfaces puts a lower limit on the useful domain size and generally domains of less than 0.1 micron are not useful.

It should be noted in FIG. 1 that the conductors 14, 15 and 16 are arranged in an interleaved pattern such that the cylindrical domains can be propagated through the shift register using the conventional three-phase voltage system.

If preferred, two dimensional three-phase propagation circuits can be created by aligning two such three-phase circuits orthogonal to each other.

The operation of the shift register of FIG. 1, is as follows: a source cylindrical domain of the preferred magnetization direction is created in the sheet 11 by any conventional means. One such means is by application of a magnetic field exceeding the nucleation threshold of the material. Another means is the controlled heating and cooling of the material. After creation, the original or "mother" domain is maintained within the domain generation loop 23 by a suitable voltage on the line 22. The original domain 30, located within the electrical confines of the generation loop 23 is large enough to overlap the splitter loop 26. The original domain 30 is written into the progation array by selectively enlarging it; thus, causing it to be expanded into loop 25, across the material beneath the splitter loop 26, by application of a suitable voltage on the lead 24. After the domain 30 has been expanded, the replication pulse source 33 is activated to apply a voltage to splitter loop 26 which severs the expanded domain into two equal domains; i.e., the original domain 30 and the replication domain 30*a*. Each of the two domains thus formed immediately adopt the size of the original domain. Interactions due to mutual field gradients now take place and the original domain 30 under loop 23 retracts to remain under the generation loop 23 while the replicated domain 30*a* adjusts itself under loop 25 and is available for propagation through the propagation circuit. By now sequentially applying a series of pulses to the conducting loops of the propagation circuit, a sequence of electrical fields are applied to the created or replicated domain 30*a* causing it to be shifted through each loop of the propagation circuit of the shift register to the final sensing loop 38. As the domain moves under the sensing loop 38, it induces a voltage in the loop which is detected by sensor circuit 31.

In summary, propagation of a domain occurs by the following sequence: a source domain is always kept within the generator loop 23 and is written into the register 10 by spreading the domain out under the outer generation loop 24 by energizing leads 22 and 24 to favor the domain magnetization inside the loop. The domain after spreading is split by energizing the inner splitter loop 26, so as to favor domain magnetization between the inner conductors. Once the domain has been properly split, the propagation conductors 14, 15 and 16 are sequentially energized, so that the created domain is shifted by the created field gradients, while the original bubble remains under the loop 23. As the bubble moves under the final sensing loop 38, the local changes in electrical field strengths induces a sensing voltage in loop 38.

Once the domain has been sensed by loop 38, it is necessary to clear the loop 38 for the next oncoming domain. This clearing of loop 38 is accomplished by destroying the sensed domain under the sensing loop. This domain destruction is caused by applying a bias field from source 31 on the sensing loop 38 which is above the stability range of the domain under the loop 38. This causes the domain to collapse and disappear, thus clearing the sensing loop 38 for the next domain in the propagation circuit. It is of course understood that such bubbles would represent a binary "1" and the absence of such bubbles would represent a binary "0". Thus at certain selected times in the sequence of operation to introduce a "0" bubble 30 would not be split and no additional bubble would be introduced into the circuit. The absence of the bubble would thus represent a "0".

The output of sensing circuit 31 is sent to the controller 30 where it is used to energize, through a feedback loop, the domain generator 32 and the replication pulse source 33 to re-introduce in place of the destroyed domain a duplicate domain into the shift register array. Thus although the domain detected by the sensing loop 38 is destroyed, the information represented by the domain is preserved and is rewritten into the system. Of couse, the output of sensing circuit 31 may also be used to energize other circuits (not shown) which will utilize the information represented by the bubbles or their absence.

In addition to the above described binary alloys of cobalt, ternary or more complex alloys formed of cobalt and two or more of the above described addition elements can yield unique characteristics not possible in a simple binary alloy.

Especially preferred are alloys of the cobalt-ruthenium and cobalt-rhenium system containing ternary osmium, rodium, iridium, palladium or platinum.

While the invention has been particularly shown and described with reference to the preferred embodiments thereof, it will be understood by those skilled in the art that various changes in form and details of the device and the method of making it may be made therein without departing from the spirit and scope of the invention.

What is claimed is:

1. A magnetic cylindrical domain memory comprising a single crystal alloy magnetic material, means coupled to the material for creating mobile magnetic domains in the material, and means coupled to the material for maintaining and propagating the created domains through the material, said material consisting essentially of a magnetic, metallic, single crystal alloy of at least 50 percent cobalt and at least one addition element depressing the magnetization of the cobalt while stabilizing the hexagonal phase of the alloy to a temperature higher than the transformation temperature of pure cobalt, whose anisotropy is greater than its demagnetizing field, the addition element being taken from the class of materials consisting of ruthenium, rhenium, osmium, rhodium, irridium, silicon, germanium, arsenic and platinum.

2. The memory of claim 1 wherein said alloy consists essentially of cobalt and more than zero but less than 4 atomic percent arsenic.

3. The memory of claim 1 wherein said alloy consists essentially of cobalt and more than zero but less than 10 atomic percent of germanium.

4. The memory of claim 1 wherein said alloy consists essentially of cobalt and between 2.8 atomic percent and 40 atomic percent of iridium.

5. The memory of claim 1 wherein said alloy consists essentially of cobalt and between 2.8 atomic percent and 40 atomic percent of osmium.

6. The memory of claim 1 wherein said alloy consists essentially of cobalt and between 5 – 25 atomic percent of platinum.

7. The memory of claim 1 wherein said alloy consists essentially of cobalt and between 5 – 25 atomic percent of rhenium.

8. The memory of claim 1 where said alloy consists of cobalt and between 5 – 50 atomic percent of rhodium.

9. The memory of claim 1 wherein said alloy consists essentially of cobalt and between 3.6 – 35 atomic percent of ruthenium.

10. The memory of claim 1 wherein said alloy consists essentially of cobalt and between 3.6 – 12 atomic percent of silicon.

* * * * *